OR  3,736,045

United States
Heidrich et al.

[11] 3,736,045
[45] May 29, 1973

[54] FAST OPTICAL GUIDED WAVE MODULATOR AND DIGITAL DEFLECTOR

[75] Inventors: Paul F. Heidrich, Mahopac; Lawrence Kuhn, Ossining; Keith S. Pennington, Somers, all of N.Y.

[73] Assignee: International Business Machines Corporation, Armonk, N.Y.

[22] Filed: Dec. 27, 1971

[21] Appl. No.: 212,523

[52] U.S. Cl. ........... 350/161, 350/96 WG, 350/160 R
[51] Int. Cl. .............................. G02f 1/32, G02b 5/14
[58] Field of Search ................. 350/96 WG, 161, 160

[56] References Cited
UNITED STATES PATENTS
3,655,261   4/1972   Chang .................................. 350/161

OTHER PUBLICATIONS

V. Sadagopan et al., "Acoustic–Optic Deflector" IBM Tech. Discl. Bul., Vol. 13, No. 1, 6/70, pp. 99–1001.
Optical Spectra, Vol. 4, No. 10, 11/70, p. 11.

*Primary Examiner*—Ronald L. Wibert
*Assistant Examiner*—V. P. McGraw
*Attorney*—John J. Goodwin, John J. Goodwin, Murray Nanes et al.

[57] ABSTRACT

An optical guided wave modulator and digital deflector is described having a piezoelectric substrate with an amorphous film waveguide thereon. An interdigital periodic electrode structure is connected to the amorphous film and to a source of d.c. voltage. The voltage produces fringing fields which generate a periodic strain in the piezoelectric substrate. The compressional strain in the piezoelectric substrate extends into the amorphous film to produce a periodic variation of index of refraction which functions as a grating at the Bragg angle which deflects an optical wave traveling in the amorphous film.

6 Claims, 2 Drawing Figures

FAST OPTICAL GUIDED WAVE MODULATOR AND DIGITAL DEFLECTOR

BACKGROUND OF THE INVENTION

1. Field of the Invention

The present invention relates to the deflection of optical waves and more particularly to the deflection of optical waves traveling in an amorphous waveguide by means of a strain pattern induced in a piezoelectric substrate by an electrode on the surface.

2. Description of the Prior Art

It is known that an optical wave traveling in a surface waveguide can be deflected by acoustic waves generated by an acoustic transducer. The deflection of the optical wave occurs due to the interaction of the optical and acoustic waves and the angle of deflection is determined by the frequency of the acoustic wave.

A typical prior art device is described in the publication "Deflection of an Optical Guided Wave by a Surface Acoustic Wave" by L. Kuhn, M. L. Dakss, P. F. Heidrich and B. A. Scott, Applied Physics Letters, Vol. 17, No. 6, Sept. 15, 1970. In this publication a device is described consisting of a glass film optical waveguide on a quartz piezoelectric crystal. An interdigital acoustic transducer on the quartz crystal and connected to a source of a.c. signal at radiofrequency causes acoustic waves to propagate in the quartz crystal. An optical wave traveling in the glass film at right angles to the direction of the acoustic waves interacts with the acoustic waves and is deflected at an angle.

In the present invention there is no interaction between an optical wave and an acoustic wave. A periodic strain is produced in a piezoelectric crystal substrate as a result of a d.c. signal connected to a periodic electrode structure. The spatially periodic strain in turn produces a periodic variation of the index of refraction of an amorphous optical waveguide deposited on the substrate which in turn acts as an optical grating for a wave in the guide.

An advantage of the present invention over the prior art is that rapid base-band modulation of the guided optical waves can be realized. Also, since there is no direct interaction between the optical and acoustic waves there is no necessity to provide the condition of acoustic synchronism. Thus, the device can operate over a very large bandwidth, much larger than possible with prior art devices.

It is also known that phase diffraction structures can be made by applying a varying electric field across an electro-optic material. For example, electro-optic crystal slabs with varying charge distribution are known. These structures have proved impractical in film form because of scattering loss. The present invention is distinct from previous known structures because of the use of an amorphous waveguide film which can be easily fabricated with very good optical quality and still produce the desired deflection and modulation.

SUMMARY AND OBJECTS

An object of the present invention is to provide a modulator and deflector for optical waves having very large bandwidth operation and utilizing a low loss amorphous film waveguide.

Another object of the present invention is to provide a modulator and deflector for guided optical waves utilizing a switchable periodic grating produced in an optical waveguide.

Still another object of the present invention is to provide a modulator and deflector for optical guided waves which is compatible with an integrated optical signal processing system.

A further object of the present invention is to provide a modulator and deflector for optical waves wherein a spatially periodic electrode structure is used to generate periodic strains in a piezoelectric crystal acting as a periodic grating in an optical waveguide.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
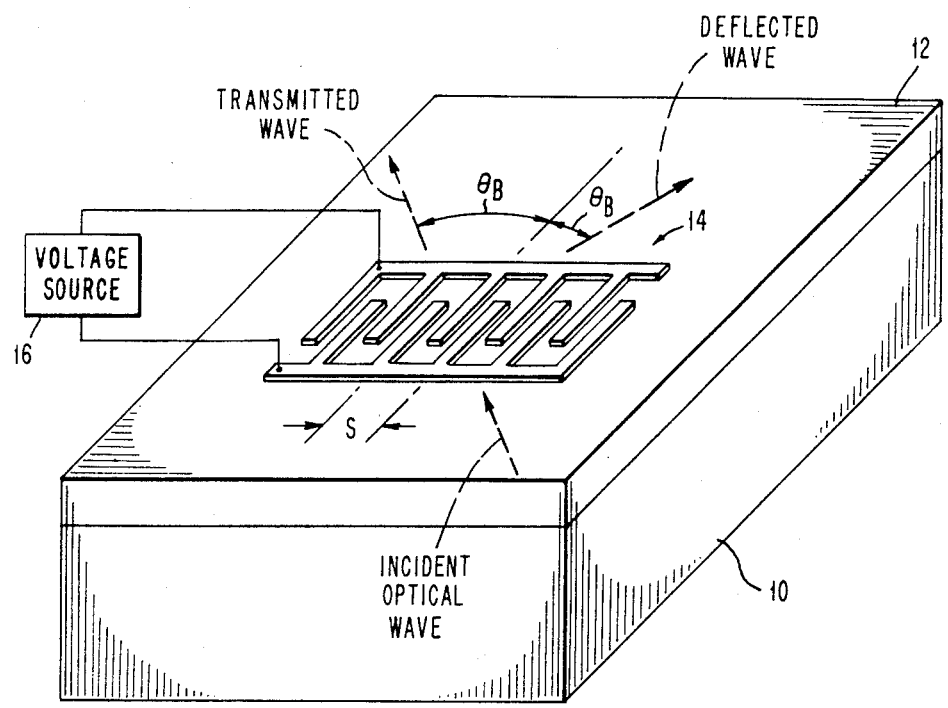
FIG. 1 is a partly schematic drawing of an embodiment of an optical guided wave modulator and deflector according to the principles of the present invention.

Referring to FIG. 1, a partly schematic longitudinal view of an optical guided wave modulator and deflector is shown including a piezoelectric substrate 10 composed of a material such as crystal quartz or lithium niobate. Deposited on the substrate 10 is a thin amorphous film 12 composed of material such as glass. An interdigital electrode 14 is connected onto the surface of thin film 12 and is in turn connected to a source of d.c. voltage 16.

The d.c. voltage applied to the interdigital electrode 14 generates a periodic strain in film 12 as a result of piezoelectric coupling to the substrate 10. Since the substrate 10 is connected to the thin film 12, the compressional strain in substrate 10 resulting from the piezoelectric coupling is transferred to thin film 12 where a spatially periodic variation of index of refraction of thin film 12 is generated as a result of the elasto-optic coupling.

The compressional strain in thin film 12 acts as a grating and can be used to modulate and deflect an optical wave traveling in the thin film 12. In FIG. 1 the device is operated in a Bragg deflection mode provided that the Bragg conditions are satisfied as follows, $$\beta \sin \theta/2 = \pi/S , \sin \theta = \lambda/S$$

where $\beta = 2\pi/\lambda$ is the propagation of the incident and diffracted optical wave illustrated by arrows in FIG. 1, $\theta$ is the deflection angle and S is the spacing of the electrodes of interdigital transducer 14.

The speed with which the spatially periodic index of refraction can be switched is determined by the capacitance of the interdigital array and the characteristic impedance of the transmission line driving it. Typically, a capacitance of 1 picofarad and an impedance of 50 ohms results in a switching time T of 0.05 nanoseconds.

Figure 2:
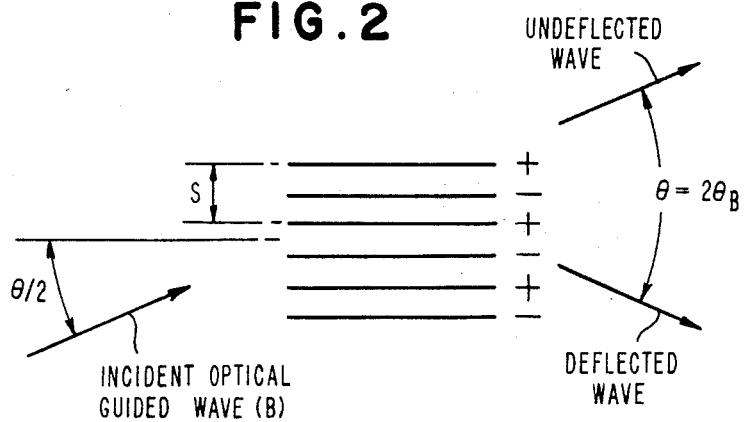
FIG. 2 is a drawing representative of a periodic grating produced in the structure of FIG. 1 and its effect on an incident optical guided wave.

FIG. 2 is an illustration of the grating produced by the compressional strain and it is shown having a periodicity of S with the aforesaid Bragg conditions satisfied.

What has been described is a fast optical guided wave switch (modulator) and digital deflector. The device is unique in that an interdigital electrode structure is used to produce a periodic index of refraction in a thin amorphous film which is used to deflect an optical wave traveling in the film. Since there is no condition of acoustic synchronism necessary, the device achieves very large bandwidth operation which can be greater than 10 gigahertz. The device, because of the nature of its fabrication, can be used compatibly with integrated optical signal processing systems.

Although the device described utilized a strictly periodic electrode structure in order to achieve deflection of an optical beam, other structures such as a linear spatial frequency chirp might be used to achieve deflection and simultaneous focussing of the optical beam.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A modulator and deflector for optical waves comprising a substrate,
   an amorphous optical waveguide connected to said substrate,
   a source of d.c. voltage supply,
   and a periodic electrode structure connected to said source of d.c. voltage and said waveguide to generate periodic strains in said substrate which are transferred to said waveguide to produce a periodic variation of the index of refractions of said waveguide.

2. A modulator and deflector according to claim 1 wherein said substrate is a slab of piezoelectric optical material.

3. A modulator and deflector according to claim 1 wherein said electrode structure is a spatially periodic interdigital electrode connected to a source of direct current voltage.

4. A modulator and deflector according to claim 1 wherein said amorphous optical waveguide is composed of glass.

5. A modulator and deflector for optical waves comprising a substrate composed of a slab of piezoelectric crystal material,
   an amorphous optical waveguide film connected to the top of said substrate for conducting optical waves,
   a source of direct current voltage,
   and a periodic electrode structure connected to said source of direct current voltage and connected to the top of said amorphous waveguide for generating periodic compressional strains in said substrate which generates a spatially periodic variation of the index of refraction of said amorphous waveguide for deflecting optical waves in said waveguide.

6. A modulator and deflector according to claim 5 wherein said electrode structure is a spatially periodic interdigital electrode structure.

* * * * *